(No Model.)

T. J. BOWEN & J. F. BARNES.
CULTIVATOR.

No. 300,686. Patented June 17, 1884.

WITNESSES
E. H. Bates
John T. Morrow

INVENTORS
Thos. J. Bowen.
Jas. F. Barnes.
by Anderson & Smith
their ATTORNEYS

UNITED STATES PATENT OFFICE.

THOMAS JEFFERSON BOWEN AND JAMES FRANKLING BARNES, OF PICKENS, SOUTH CAROLINA.

CULTIVATOR.

SPECIFICATION forming part of Letters Patent No. 300,686, dated June 17, 1884.

Application filed March 5, 1884. (No model.)

*To all whom it may concern:*

Be it known that we, THOMAS J. BOWEN and JAMES F. BARNES, citizens of the United States, residing at Pickens, in the county of Pickens and State of South Carolina, have invented certain new and useful Improvements in Cultivators; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
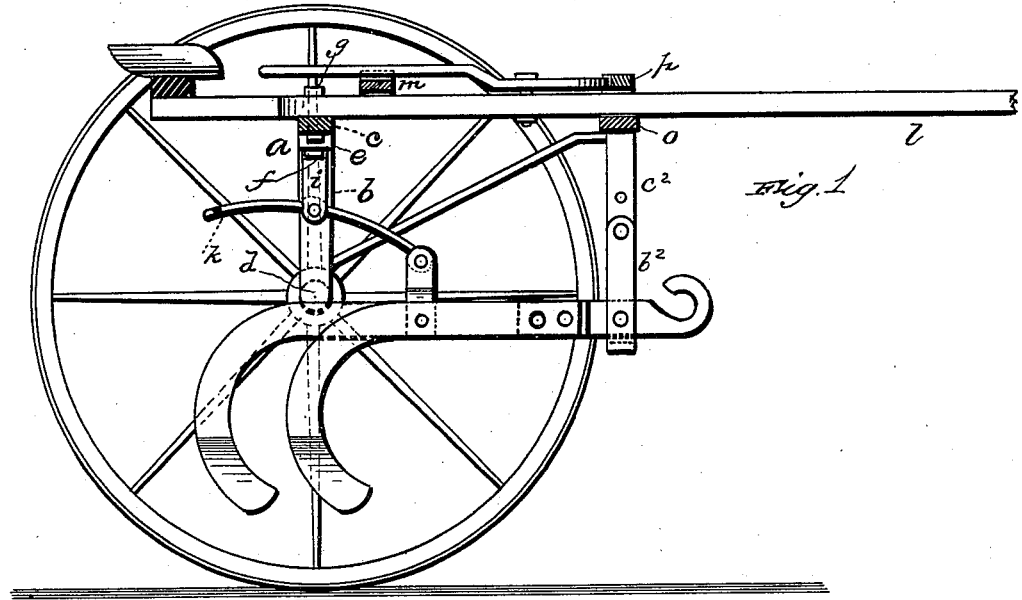
Figure 2:
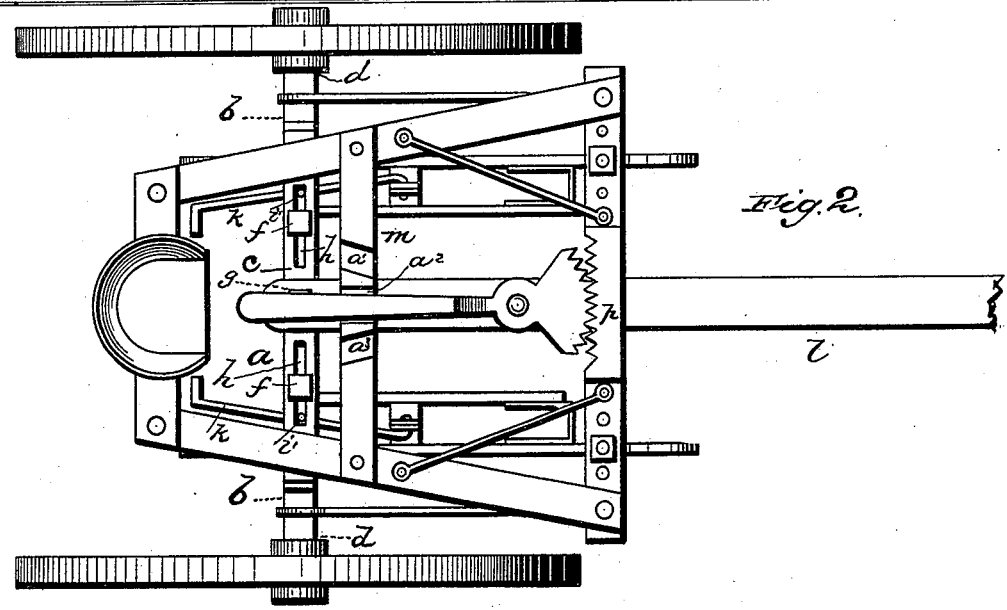
Figure 3:
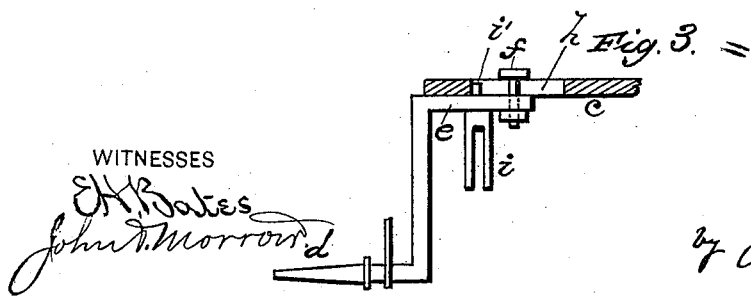

Figure 1 of the drawings is a representation of a vertical sectional view of our device. Fig. 2 is a plan view of the same, and Fig. 3 is a detail view.

This invention has relation to wheel-cultivators; and it consists in the construction and novel arrangement of devices, as will be hereinafter fully described, and particularly pointed out in the claims appended.

This riding or sulky cultivator is adapted to be used both on level land and hillside land, the tongue of the implement being pivoted at its rear end to the arched or bowed axle of the machine, and provided with a pivoted ratchet-lever engaging a serrated ratchet-loop to shift the line of draft from a center line to both the right and left of the center line to an angle of about forty-five degrees, as shown, the ratchet-lever being held to its adjustment in notches in a cross-bar on the main frame in front of the driver's seat.

Referring by letter to the accompanying drawings, $a$ designates the arched axle, which is made in three pieces, $b$, $b'$, and $c$. The pieces $b$ $b'$ are angle-irons and carry the axle-journals $d$ $d$. Their inner upper arms, $e$, are provided with locking-bolts $f$, by which they may be adjusted laterally on the connecting-bar $c$, which is provided with elongated slots $h$ $h$ at opposite sides of its middle portion. The arms $e$ also carry the fulcra $i$ $i$ for the foot-levers $k$ $k$, by which the cultivator-standards are elevated when it is designed to transport the cultivator from place to place, or to avoid an obstruction in the field. The fulcra $i$ $i$ are bifurcated, and have studs or stems $i'$, which project up into the elongated slots $h$ $h$, to regulate the distance to which the angle-irons can be adjusted outwardly laterally, and to serve as guides when the nut-bolts $f$ are loosened in the slots. The rear end of the tongue $l$ is pivoted to the middle of the connecting-bar $c$ by a screw-bolt, $g$. The driver's seat is at the rear of the main frame. A transverse bar, $m$, traverses the frame in front of the axle and over the tongue, and is provided with one central and two oblique notches, $a'$ $a^2$ $a^3$. The front cross-bar, $o$, of the frame is provided with a ratchet-loop, $p$, through which the tongue passes, and in which it plays when the ratchet-lever is adjusted to regulate the draft, so that it may be central, or to either the right or left hand in side-hill plowing. Suitable braces connect the frame portions and the curved axle.

The front portions of the cultivator-standards are pivoted in hangers $b^2$, pivoted to depending arms $c^2$, bolted to the cross-bar $o$.

The cultivator-beams may be of any ordinary construction, and should be made in pairs, a weight-end connection being made between the foot-levers and each pair of beams or standards. The standards have slotted lower terminations, and any class of points may be employed in connection therewith. The main beam of each pair of standards is provided with a hook, to which the equalizer is to be connected in the usual manner.

In cultivating level ground the ratchet-lever should be adjusted in the central notch, $a^2$; but in cultivating side-hill land the ratchet-lever should rest in either the right-hand or left-hand notch of the transverse bar. The draft will then be upward on the line of the draft, and will hold the cultivators to their work.

Having thus fully described our invention, what we claim as new, and desire to secure by Letters Patent, is—

1. In a sulky-cultivator, the combination, with the frame provided on its forward transverse bar with a loop-rack, $p$, of a tongue pivoted at its rear end to the arched axle, the ratchet-lever pivoted on the pivoted tongue engaging the loop-ratchet, and the transverse notched bar $m$, for seating the lever in its adjustment, substantially as specified.

2. The combination, in an arched axle, of the angle-irons $e$, with spindles $d$, having fulcrum-brackets $i$ and studs $i'$, with the axle-bar $c$, having slots $h$, and the bolts $f$, substantially as specified.

In testimony whereof we affix our signatures in presence of two witnesses.

THOMAS JEFFERSON BOWEN.
JAMES FRANKLING BARNES.

Witnesses:
CHARLIE Q. DRENNAN,
JAMES S. HALPEN.